Sept. 17, 1957 J. P. JORGENSON 2,806,368
DRY CLEANING
Filed March 18, 1953 2 Sheets-Sheet 1

JOHN P. JORGENSON
INVENTOR.

BY
*Morsell & Morsell*
ATTORNEYS

Sept. 17, 1957  J. P. JORGENSON  2,806,368
DRY CLEANING
Filed March 18, 1953  2 Sheets-Sheet 2
FIG. 2.
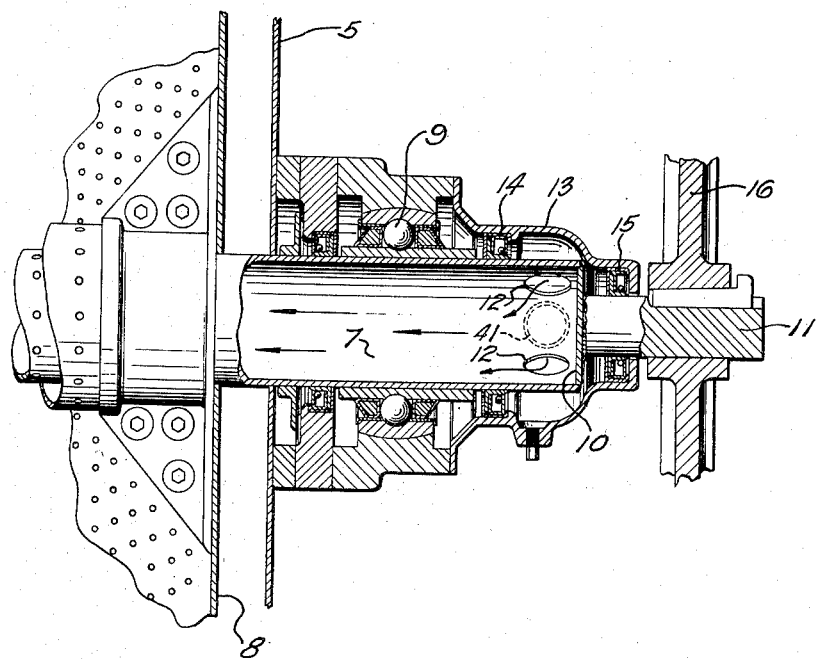
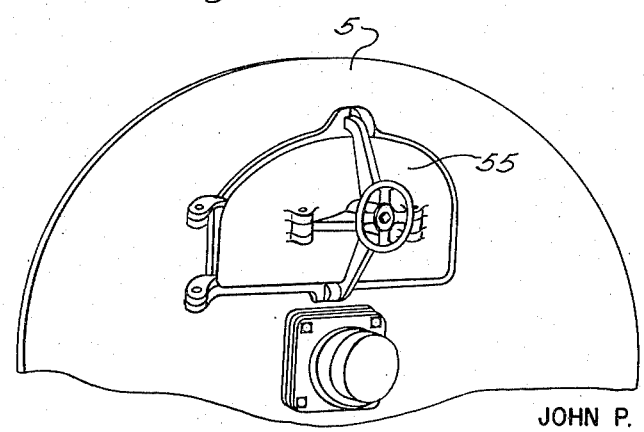
FIG. 3.
JOHN P. JORGENSON
INVENTOR.
BY
*Morsell & Morsell*
ATTORNEYS

United States Patent Office 2,806,368
Patented Sept. 17, 1957

2,806,368

DRY CLEANING

John P. Jorgenson, Chicago, Ill.

Application March 18, 1953, Serial No. 343,067

6 Claims. (Cl. 68—18)

This invention relates to improvements in dry cleaning.

In my copending application, Serial No. 244,313, filed August 8, 1951, now Patent No. 2,612,805, I have disclosed an apparatus in which a dry cleaning operation can be carried out with substantially complete recovery of the solvent used. It is standard practice in dry cleaning to use perchlorethylene as the solvent and to have it relatively highly charged with soap. Neither the apparatus disclosed in my copending patent, nor other dry cleaning devices remove the soap from the garments in a satisfactory manner.

With the above in mind it is a principal object of the invention to provide an improved dry cleaning apparatus and process which effectively removes substantially all traces of soap from the garments being cleaned.

Another object of the invention is to provide an improved dry cleaning apparatus in which the hot air inlet is located remotely from the loading door so that the latter does not become overheated.

A more specific object of the invention is to provide an improved dry cleaning apparatus of the class described which provides a pure solvent rinse to effectively remove substantially all traces of soap left in garments after the usual washing and extracting stages of a dry cleaning operation.

A further specific object of the invention is to provide an improved dry cleaning apparatus of the class described wherein there is means for recovering and distilling the soap-solvent solution which results from the rinsing operation, there also being means for condensing the solvent thus distilled so that it may be used for subsequent rinsing operations.

A further specific object of the invention is to provide an improved dry cleaning apparatus having a novel garment cylinder shaft and bearing construction which permits the hot air to be introduced into the cylinder shaft through that end of the shaft to which the drive pulley is fixed.

A further object of the invention is to provide an improved dry cleaning apparatus in which the complete cycle of operation, including the novel rinsing stage, is carried out automatically.

With the above and other objects in view, the invention consists of the improved dry cleaning apparatus, and all of its parts and combinations, as set forth in the claims, and all equivalents thereof.

In the drawings accompanying and forming a part of this specification, wherein one complete embodiment of the preferred form of the invention is shown, and wherein like characters of reference indicate the same parts in all of the views:

Fig. 2 is an enlarged vertical sectional view through the end of the garment cylinder and casing, showing the hollow shaft, as well as the bearings, air inlet and driving connections for said shaft; and Fig. 3 is a fragmentary end elevational view of the upper portion of the loading end of the casing.

Figure 1:
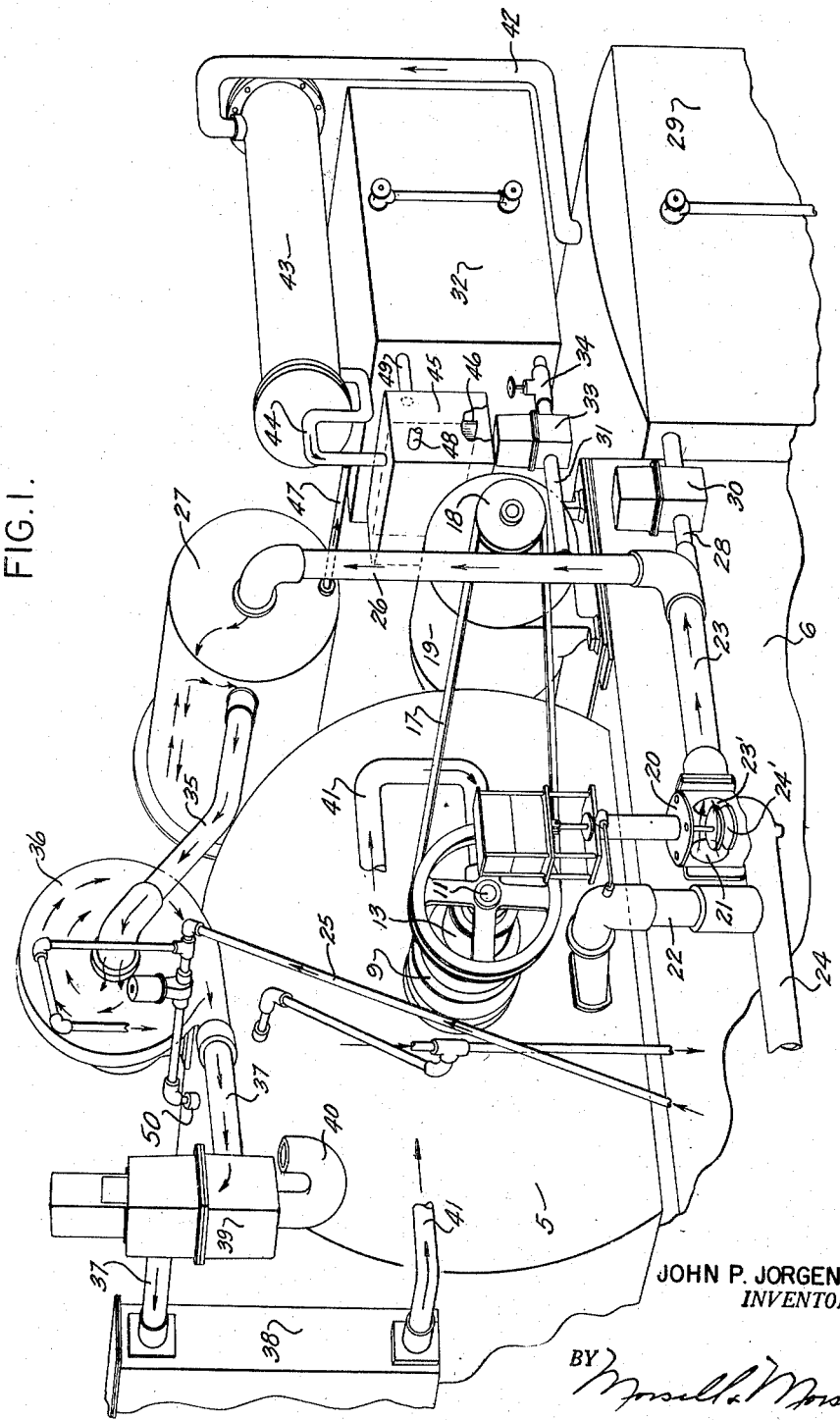
Fig. 1 is a fragmentary perspective view of the improved dry cleaning apparatus, parts being broken away.

Referring more particularly to the drawings, the improved dry cleaning apparatus includes a generally cylindrical casing 5 supported on a suitable base 6 which preferably includes a storage tank (not shown) for dry cleaning solution. Extending axially within the casing 5 is a rotatably supported hollow shaft 7 (Fig. 2) to which is fixed a coaxial garment cylinder 8. The garment cylinder 8 and casing 5 are provided with suitable door-equipped loading openings in the end walls which are opposite those shown in Figs. 1 and 2. The loading opening door for the casing 5 is indicated by the numeral 55 in Fig. 3.

Referring to Fig. 2, one end of the shaft 7 is suitably journalled in a bearing 9 including a suitable housing mounted on an end wall of the casing 5. The shaft 7 projects axially outwardly of the bearing 9, and has its outer end closed by a circular plate 10 fixed thereto by any method such as welding. A stub shaft 11 is suitably fixed to the plate 10 coaxially with the shaft 7. Adjacent the plate 10 the shaft 7 is formed with a plurality of air inlet apertures 12. A cap or collar 13 surrounds the end of shaft 7 and is mounted on the housing portion of the bearing 9. The stub shaft 11 projects through a suitable aperture in the cap 13, said cap being provided with circular seals 14 and 15 coacting respectively with the shaft 7 and stub shaft 11. A driving pulley 16 is keyed to the stub shaft 11 outwardly of the cap 13, and an endless belt 17 (Fig. 1) connects said pulley with a pulley 18 on the shaft of an electric motor 19.

An electrically operated dump valve 20 communicates with a lower portion of the interior of the casing 5, through a port 21, and controls the flow of cleaning fluid from the bottom of said casing. Another port 23' in the valve 20 communicates with a line 23; and a discharge port 24' communicates with a discharge line 24 which leads to the storage tank (not shown). Another line 22 extends from the casing 5 to the discharge line 24 and serves as an overflow line for controlling the height of the liquid within the casing 5 during a washing operation. Cleaning fluid, preferably perchlorethylene which is highly charged with soap (3% solution) is stored in the storage tank (not shown) and is directed into an opening 50 in the top of the casing 5 through a line 25.

The line 23 is connected to a line 26 which affords communication with the inlet of a condenser 27, said line 23 also being connected to a line 28 which affords communication with a still 29. A solenoid shut-off valve 30 is interposed in the line 28. A line 31 affords communication between a supply tank 32 and the line 26, there being a solenoid shut-off valve 33 as well as a manual metering valve 34 interposed in the line 31.

The air outlet of the condenser 27 is connected to a line 35 which affords communication with the inlet of an electrically driven centrifugal blower 36. The blower 36 discharges into a line 37 which leads to the inlet of a heater 38, said line having interposed therein a solenoid-operated air valve assembly 39 having a vent tube 40. The outlet of the heater 38 is connected to a line 41 which affords communication with the interior of the cap 13 on the bearing 9.

The outlet of the still 29 is connected to a line 42 which affords communication with a condenser 43. An S-shaped line 44 is connected to the outlet of the condenser 43 and has a predetermined rise (preferably about 3") above the bottom of said condenser so that the condensed solvent will build up in the condenser to a predetermined level and be cooled before discharge from the condenser. The line 44 affords communication with a tank 45 on one side of a partition 46 extending downwardly from the top thereof to a point spaced from the bottom. A line 47 affords communication between the condensate outlet of the condenser 27 and the line 44 as shown. A water outlet and vent line 48 also communicate with the tank 45 on the same side of the partition 46 as line 44. A line 49 affords communication between an upper side wall portion of the tank 45 and the supply tank 32, said line opening into the tank 45 on the opposite side of the partition 46 from the line 44. The supply tank 32 normally contains pure perchlorethylene.

In operation of the improved dry cleaning apparatus, the solenoid valves 30 and 33 are normally closed, and the metering valve 34 is opened a predetermined amount. During the washing cycle the port 24' of the dump valve 20 is closed, and after said cycle is completed, the port 24' is opened as shown, to allow all of the solvent-soap solution in the casing 5 to flow to the storage tank through the line 24. The extracting cycle then takes place, and the solvent-soap solution extracted from the clothes also drains back to the storage tank through the dump valve 20 and line 24.

After the extraction cycle about twenty-five percent by weight of solvent-soap solution remains in the garments. The soap must be removed from the garments in order to prevent them from becoming rancid. The port 24' is dump valve 20 is then closed and the solenoid valve 33 is opened for a predetermined period sufficient to permit about twenty gallons of pure perchlorethylene to flow into the casing 5 through lines 31, 26 and 23, and through dump valve ports 21 and 23'. The garment cylinder 8 is then rotated at washing speed to permit the pure perchlorethylene to remove the last traces of soap from the garments.

The solenoid valve 30 is then opened to permit the solvent-soap solution in th casing 5 to drain into the still 29 through dump valve ports 21 and 23' and through lines 23 and 28. The valve 30 remains open while the cylinder 8 is then rotated at extracting speed, and the liquid thus extracted is permitted to flow into the still 29. The solenoid valve 30 is then closed, and the drying cycle is begun. During this cycle the blower 36 draws solvent-vapor-laden air from the casing 5 through the lines 23 and 26 to the condenser 27. The solvent vapors are condensed in the condenser 27 and flow to the tank 45 through the lines 47 and 44. The air leaving the condenser 27 is blown into the heater 38, and the heated air is returned to the rotating garment cylinder through the line 41, cap 13, and hollow shaft 7.

The solvent in the solvent-soap solution which has been directed into the still 29 is vaporized in said still and flows to the condenser 43 through the line 42. The pure perchlorethylene vapors are condensed in the condenser 43 and the condensate is cooled before it flows to the tank 45 through the line 44. Any water entering the tank 45 through the line 44 remains on the surface of the solvent on one side of the partition 46, from which side it can be removed through the pipe 48 as required. The pure perchlorethylene flows from the tank 45 through the line 49 to the supply tank 32. Thus the supply of pure perchlorethylene in the supply tank 32 is continually replenished.

The improved dry cleaning apparatus effectively removes substantially all of the soap from the garments and also all of the solvent. The apparatus is efficient, and the entire cycle of operation can be carried out automatically by suitable electrical time controls (not shown).

Various changes and modifications maye be made without departing from the spirit of the invention, and all of such changes are contemplated, as may come within the scope of the claims.

What I claim is:

1. In a dry cleaning apparatus having a casing provided with a garment loading opening: a bearing mounted on a wall of said casing remote from said loading opening; a hollow drum supporting shaft having a closed end projecting through said casing wall and through said bearing, said shaft having an opening outwardly of said bearing and inwardly of the closed end, which opening affords communication with the hollow interior of the shaft; a stub shaft fixed coaxially to said closed end of said shaft; a hollow collar sealingly surrounding said hollow shaft and a portion of said stub shaft and communicating with said opening of the hollow shaft, said collar having a fluid inlet connection; and a drive pulley fixed to said stub shaft outwardly of said collar.

2. In a dry cleaning apparatus having a casing within which garments are adapted to be cleaned with a soap-solvent solution and subsequently rinsed with a pure solvent solution: a discharge line leading from said casing for draining off wash solution after washing; a supply tank normally containing pure rinse solvent; means for directing pure solvent from said tank into said casing to rinse soap from the garments; a still; means independent of the discharge line for the wash solution for draining soapy rinse liquid directly from said casing into said still; and a condenser having an inlet connected to said still and having an outlet connected to said supply tank to condense solvent vaporized in said still and deliver the pure solvent condensate to said rinse supply tank.

3. In a dry cleaning apparatus having a casing within which garments are adapted to be cleaned with a soap-solvent solution and subsequently rinsed with a pure solvent solution: a discharge line leading from said casing for draining off wash solution after washing; a supply tank normally containing pure rinse solvent; means for directing said pure solvent from said tank into said casing; a still; means including a drain line separate from the discharge line for the wash water for draining soapy rinse liquid from said casing into said still; a first condenser having an inlet connected to said still and having an outlet connected to said supply tank to condense solvent vaporized in said still and deliver the pure solvent condensate to said supply tank; means for circulating heated air through said casing; and a second condenser connected to said casing to receive vapor-laden air therefrom, said second condenser also being connected to said supply tank to direct pure solvent condensate from said second condenser into said rinse supply tank.

4. In a dry cleaning apparatus having a casing within which garments are adapted to be cleaned with a soap-solvent solution: a dump valve connected to a lower portion of said casing; a first conduit leading from said dump valve to permit selective draining of soap-solvent wash solution from the casing when the valve is opened; a second conduit connected to said valve and continuously communicating with said casing through said valve; a supply tank normally containing pure solvent; valve-controlled means connecting said supply tank and second conduit for directing pure solvent from said tank into said casing; a still below said casing; valve controlled means connecting said still and second conduit to permit draining of liquid from said casing into said still; and a condenser having an inlet connected to said still and having an outlet connected to said supply tank to condense solvent vaporized in said still and deliver the pure solvent to said supply tank.

5. In a dry cleaning apparatus having a casing within which garments are adapted to be cleaned with a soap-solvent solution: a solenoid operated dump valve connected to a lower portion of said casing; a first conduit leading from said dump valve to permit selective draining of soap-solvent solution from the casing when the valve is opened; a second conduit connected to said valve and continuously communicating with said casing through said valve; a supply tank normally containing pure solvent; means including a solenoid operated valve connecting said supply tank and second conduit for directing solvent from said tank into said casing; a still below said casing; means including a solenoid operated valve connecting said still and second conduit to permit draining of liquid from said casing into said still; and a condenser having an inlet connected to said still and having an outlet connected to said supply tank to condense solvent vaporized in said still and deliver the pure solvent condensate to said supply tank.

6. In a dry cleaning apparatus having a casing within which garments are adapted to be cleaned with a soap-solvent solution and subsequently rinsed with a pure solvent solution: a discharge line leading from said casing for draining off wash solution after washing, a supply tank normally containing pure rinse solvent; means for directing pure solvent from said tank into said casing to rinse soap from the garments; a still; means independent of the discharge line for the wash solution for draining soapy rinse liquid directly from said casing into said still; a condenser having an inlet connected to said still and having an outlet connected to said supply tank to condense solvent vaporized in said still and deliver the pure solvent condensate to said rinse supply tank, means for circulating a drying fluid through the casing to remove solvent vapors, means for condensing said vapors, and means for returning said condensed solvent to said rinse supply tank.

References Cited in the file of this patent

UNITED STATES PATENTS

| | | |
|---|---|---|
| 654,530 | Erben | July 24, 1900 |
| 890,568 | Maine | June 9, 1903 |
| 1,410,230 | Wagner | Mar. 21, 1922 |
| 1,615,897 | Aydelotte | Feb. 1, 1927 |
| 1,865,218 | Spalding | June 28, 1932 |
| 2,070,204 | Hetzer | Feb. 9, 1937 |
| 2,121,431 | Hamm | June 21, 1938 |
| 2,166,294 | Hetzer | July 18, 1939 |
| 2,630,694 | Creswick | Mar. 10, 1953 |